United States Patent [19]

Stuhlmacher

[11] Patent Number: 5,541,377
[45] Date of Patent: Jul. 30, 1996

[54] PANEL MOUNTED SWITCH AND METHOD OF ASSEMBLING SAME

[75] Inventor: John Stuhlmacher, Crown Point, Ind.

[73] Assignee: McGill Manufacturing Company, Inc., Valparaiso, Ind.

[21] Appl. No.: 286,700

[22] Filed: Aug. 5, 1994

[51] Int. Cl.[6] ............................................. H01H 9/02
[52] U.S. Cl. ........................ 200/296; 200/295; 411/437
[58] Field of Search ................................. 200/296, 294, 200/295, 300, 293; 411/371, 437, 339, 918

[56] References Cited

U.S. PATENT DOCUMENTS 2,808,482  10/1957  Zanichkowsky et al. ............... 200/553

FOREIGN PATENT DOCUMENTS 2249804  5/1992  United Kingdom .................... 411/339

*Primary Examiner*—David J. Walczak
*Attorney, Agent, or Firm*—Leydig, Voit & Mayer, Ltd.

[57] ABSTRACT

A switch particularly adapted for mounting to a panel. The switch includes a housing, a hollow post projecting from the housing and extending through an opening in the panel, and a nut adapted to be pushed onto the post and into engagement with the panel. The post receives a switch actuator and is formed with axially spaced frustums while the pushnut is formed with inwardly projecting tabs adapted to interlock with at least one of the frustums in order to secure the switch to the panel.

7 Claims, 2 Drawing Sheets

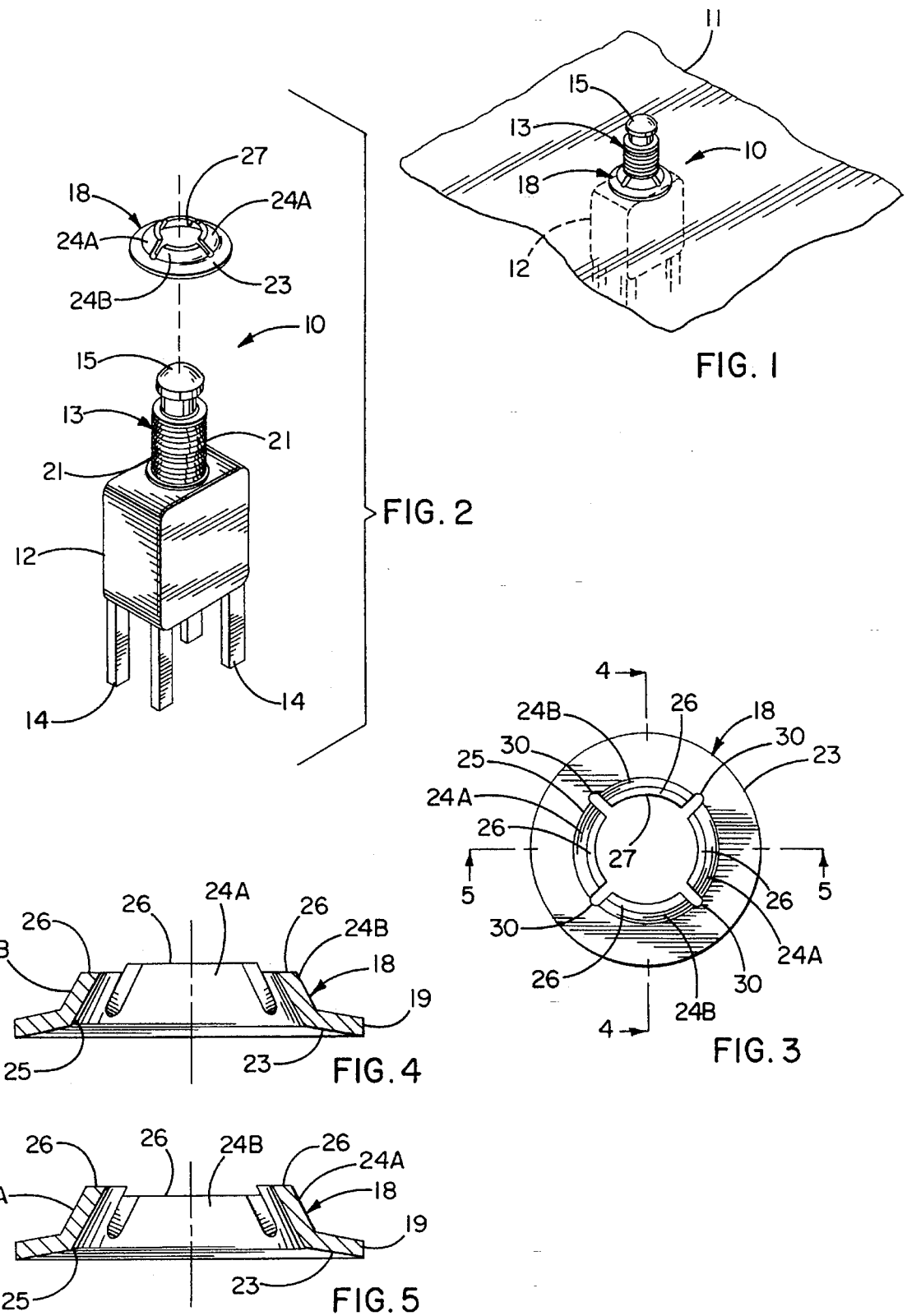

PANEL MOUNTED SWITCH AND METHOD OF ASSEMBLING SAME

BACKGROUND OF THE INVENTION

This invention relates generally to an electrical switch and more specifically to an electrical switch which is particularly adapted to be mounted to a panel.

A panel-mounted switch typically includes a hollow post which projects from a housing and which extends through an opening in the panel. A switch actuator is located in the post. Prior panel-mounted switches typically have an externally threaded post and are secured to the panel by locating a threaded nut on the post and tightening the nut against the panel to draw the switch housing, located on the opposite side of the panel, tight against the panel. Depending on the location of the opening in the panel with respect to objects previously secured to the panel, assembly of such a switch may be relatively difficult and time consuming, and may require special assembly tools. In addition, the threaded nut and externally threaded post are subject to cross-threading during assembly of the switch to the panel.

SUMMARY OF THE INVENTION

The general aim of the present invention is to provide a new and improved switch which, when compared to prior switches of the same general type, may be more quickly and easily secured to a panel.

Another general objective of the present invention is to secure the switch to the panel without the need for threaded components.

A detailed objective is to achieve the foregoing by providing a post and a nut adapted to interlock with a snap-acting engagement as a result of pressing the nut onto the post.

The invention also resides in the unique provisions for accommodating panels having various thicknesses.

These and other objects and advantages of the invention will become more apparent from the following detailed description when taken in conjunction with the accompanying drawings.

BRIEF DESCRIPTION OF THE DRAWINGS

FIG. 1 is a perspective view of a new and improved switch incorporating the unique features of the present invention and shows the switch secured to a panel.

FIG. 2 is an enlarged exploded perspective view of the switch.

FIG. 3 is an enlarged top plan view of a pushnut.

FIGS. 4 and 5 are enlarged cross-sectional views taken substantially along the lines 4—4 and 5—5, respectively, of FIG. 3.

Figure 6:
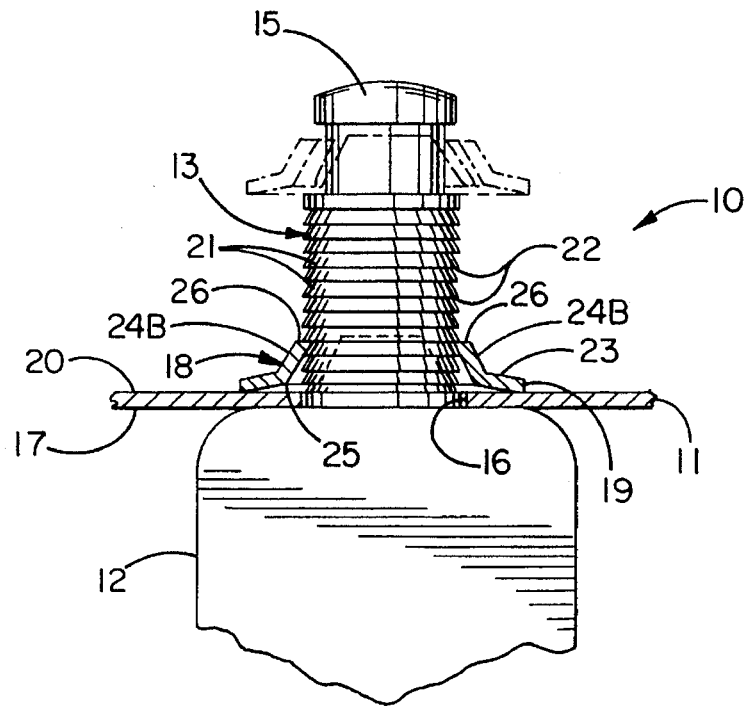
FIGS. 6 and 7 are enlarged front and side views, respectively, of the switch with certain parts being broken away and shown in cross-section.

While the invention is susceptible of various modifications and alternative constructions, a certain illustrated embodiment hereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF THE PREFERRED EMBODIMENT

For purposes of illustration, the present invention is shown in the drawings as embodied in a switch 10 (FIG. 1) which, while useful for many other purposes, is particularly suitable for mounting to a panel 11.

The switch 10 (FIG. 2) includes a housing 12, a hollow post 13 projecting from the housing and electrical terminals 14 extending oppositely from the housing. An actuator such as a push button 15 or toggle lever (not shown) is received within the post and extends from the free end thereof. When the switch is mounted to the panel 11 (FIG. 6), the post extends through an opening 16 in the panel and the housing engages one side 17 of the panel. A nut 18 having an outside periphery 19 larger than the opening in the panel secures the switch to the panel by simultaneously engaging the post and the panel on the side 20 thereof opposite the housing.

In accordance with the present invention, the post 13 and the nut 18 are uniquely constructed to interlock with a snap-acting engagement. As a result, the switch 10 may be quickly and easily secured to the panel 11 by simply pressing the nut into locking engagement with the post after the post has been inserted through the opening 16 in the panel.

More specifically, the post 13 is formed with a series of generally circular and axially spaced steps or axially stacked frustums 21 of approximately equal size. The frustums taper inwardly upon progressing toward the free end of the post and define a series of generally circular shoulders 22 with surfaces facing the housing 12.

The nut 18 (FIG. 3) is formed as a generally circular pushnut and is preferably molded from resilient plastic. The pushnut includes a ring-shaped frustoconical base 23 (FIG. 4) and four angularly spaced tabs 24A, 24B integrally formed with the inner periphery 25 of the base 23. The free ends 26 of the tabs define an opening 27 in the pushnut for receiving the post 13. The frustoconical base 23 (FIG. 6) slopes away from the panel 11 upon progressing inwardly toward the post 13 so that the underside base is inclined at an acute included angle relative to the panel. The tabs protect from the inner periphery of the base and slope inwardly upon progressing toward the free end of the post at an obtuse included angle relative to the base.

To secure the switch 10 to the panel 11, the pushnut 18 is pressed onto the post 13 until the base 23 of the pushnut engages the panel. The resilient tabs 24A, 24B deflect outwardly as they ride over each of the axially spaced steps or frustums 21 and then snap inwardly as the free ends 26 of the tabs pass each of the shoulders 22. When the base of the pushnut engages the panel, the free ends of certain ones of the tabs engage the last shoulder that the tabs snapped past and prevent the nut from backing off the post. Removal of the switch from the panel is simply a matter of cutting through the base of the plastic pushnut and peeling the pushnut away from the post, leaving the frustums undamaged and ready to receive a new pushnut when the switch is reassembled to the panel.

Figure 7:
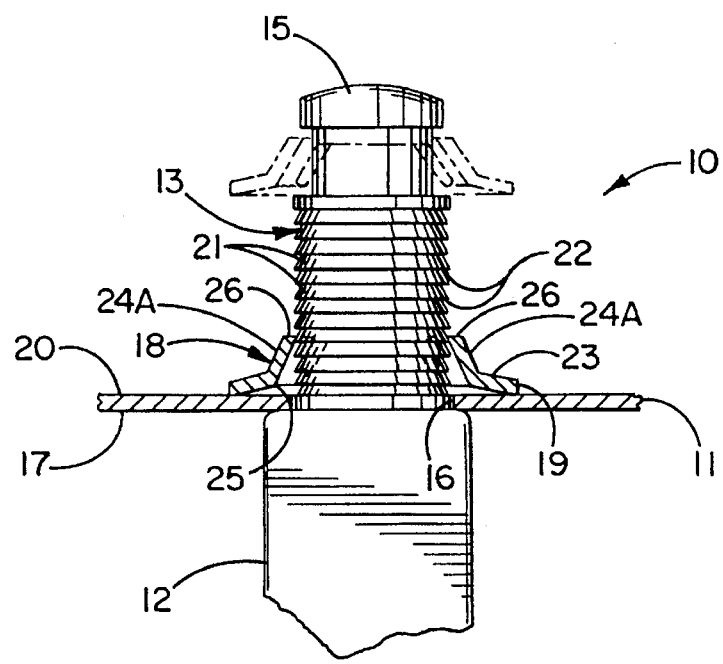

Further in accordance with the present invention, oppositely located tabs 24A, 24B (FIGS. 4 and 5) are formed in stepped pairs. As a result, the pushnut 18 is capable of accommodating various panel thicknesses. More specifically, the free ends 26 of the tabs 24A are located at a predetermined distance from the base 23 and the free ends of the tabs 24B are located at a lesser distance from the base. If the thickness of a particular panel 11 is such that one of the pairs of tabs (FIG. 7) does not engage a shoulder 22 of a frustum 21, the other pair of tabs (FIG. 6) will engage a shoulder to secure the switch 10 to the panel.

Advantageously, slots 30 (FIG. 3) defined by the edges of adjacent tabs 24A, 24B extend past the inner periphery 25 of the base 23. These extended slots, cooperating with the angle formed between the underside of the base and the panel 11, permit the inner periphery of the base to resiliently deflect toward the panel if additional pressure is applied near the inner periphery after the outer periphery 19 of the base has engaged the panel. If the free ends of tabs do not firmly engage a shoulder 22 when the outer periphery of the base engages the panel, resilient deflection of the inner periphery toward the panel pulls the free ends of one of the pairs of tabs past the shoulder of the next lowest frustum 21. When the additional pressure is released, the free ends of those tabs snap upwardly and firmly engage such shoulder. A residual elastic force remaining in the pushnut is directed toward the free end of the post 13 by the tabs acting on the shoulder. This residual force draws the switch housing 12 into secure engagement with the panel.

From the foregoing, it will be apparent that the present invention brings to the art a new and improved switch 10 having unique provisions for snap-acting engagement between the pushnut 18 and the switch post 13. These provisions result in an extremely simple method for securing the switch to a panel.

I claim:

1. A switch for mounting to a panel having an opening and first and second faces, said switch comprising:

a housing;

a hollow post fixedly secured to said housing in outwardly extending relation, said housing being adapted for positioning into engaging relation with a first face of said panel with said post extending through said opening and beyond the second face of said panel, said hollow post having a plurality of axially spaced steps, each step having a surface generally facing said panel;

a switch actuator located within said post and extending out an open outer end thereof; and a resilient pushnut having a first portion, a plurality of integrally formed tabs, and an opening for positioning over said actuator and for receiving said post, said tabs projecting inwardly from said first portion and having free edges defining the opening of the pushnut, said free edges of at least two of said tabs being located at different distances from said first portion wherein said tabs resiliently deflect as said pushnut is pressed axially onto said post toward said panel and as said opening of said pushnut receives said steps and wherein at least one of said tabs resiliently engages the surface of at least one of said steps as said first portion engages said second face of said panel thereby securing said switch to said panel.

2. A switch for mounting to a panel having an opening and having first and second faces, said switch comprising:

a housing;

a hollow post fixedly secured to said housing in outwardly extending relation, said housing being adapted for positioning into engaging relation with a first face of said panel with said post extending through said opening and beyond the second face of said panel, said hollow post being formed at least in part by a plurality of axially stacked frustums, each frustum having a shoulder generally facing said panel;

a switch actuator located within said post and extending out an open outer end thereof; and a pushnut having a resilient frustoconical base, a plurality of integrally formed resilient tabs, and an opening for positioning over said actuator and for receiving said post, said tabs being spaced angularly around and projecting inwardly from said base and having free ends defining the opening of said pushnut, said free ends of at least two of said tabs being located at different distances from said base, wherein each tab deflects outwardly as the free end of said tab passes a frustum and each tab springs inwardly as the free end of said tab passes a shoulder as said opening of said pushnut receives said post, and wherein said base resiliently deflects toward said second face of said panel and at least one of said tabs engages the shoulder of at least one of said frustums as said base engages said second face thereby securing said switch to said panel.

3. A switch as recited in claim 2 wherein said tabs are inclined at an obtuse included angle relative to said base.

4. A switch as recited in claim 3 in which said tabs are defined by circumferentially spaced slots which extend into said frustoconical base.

5. A switch as recited in claim 1 in which said resilient pushnut first portion is adapted to engage said second face at an acute angle, and said tabs extend at an obtuse angle to said first portion.

6. A switch as recited in claim 5 in which said tabs are defined by circumferentially spaced slots which extend into said first portion.

7. A switch for mounting to a panel having an opening and having first and second faces, said switch comprising:

a housing adapted to engage said first face of said panel;

a hollow post projecting from said housing through said opening and being formed at least in part by a plurality of axially stacked frustums, each frustum having a shoulder generally facing said panel;

a switch actuator located within said post; and a pushnut having a resilient frustoconical base, a plurality of integrally formed resilient tabs, and an opening for receiving said post, said tabs being spaced angularly around and projecting inwardly from said base and having free ends defining the opening of said pushnut, said free ends of at least two of said tabs being located at different distances from said base, wherein each tab deflects outwardly as the free end of said tab passes a frustum and each tab springs inwardly as the free end of said tab passes a shoulder as said opening of said pushnut receives said post, and wherein said base resiliently deflects toward said second face of said panel and at least one of said tabs engages the shoulder of at least one of said frustums as said base engages said second face thereby securing said switch to said panel.

* * * * *